United States Patent [19]

Gaffard et al.

[11] Patent Number: 6,023,057
[45] Date of Patent: Feb. 8, 2000

[54] DEVICE FOR DETERMINING THE PHASE ERRORS OF ELECTROMAGNETIC WAVES

[75] Inventors: Jean-Paul Gaffard, Fontainebleau; Patrick Gosselin, Paris, both of France

[73] Assignee: Compagnie Industrielle des Lasers Cilas, Paris, France

[21] Appl. No.: 08/947,570

[22] Filed: Oct. 9, 1997

[30] Foreign Application Priority Data

Oct. 31, 1996 [FR] France ................................. 96 13316

[51] Int. Cl.$^7$ ....................................................... G01J 1/20
[52] U.S. Cl. ........................................ 250/201.9; 356/121
[58] Field of Search ........................... 250/201.9, 201.1; 356/121, 124, 124.5, 127, 353, 354

[56] References Cited

U.S. PATENT DOCUMENTS

| | | | |
|---|---|---|---|
| 4,518,854 | 5/1985 | Hutchin | 250/201.9 |
| 4,750,818 | 6/1988 | Cochran | 250/201.9 |
| 5,300,766 | 4/1994 | Granger et al. | 250/201.9 |
| 5,350,911 | 9/1994 | Rafanelli et al. | 250/201.9 |
| 5,396,364 | 3/1995 | O'Meara et al. | 250/201.9 |
| 5,448,052 | 9/1995 | Taylor et al. | 250/201.9 |
| 5,598,261 | 1/1997 | Duncan et al. | 250/201.9 |
| 5,610,707 | 3/1997 | Duncan et al. | 250/201.9 |

OTHER PUBLICATIONS

J. E. Graves et al., "Adaptive optics at the University of Hawaii IV: A photon counting curvature wavefront sensor", SPIE Adaptive Optics in Astronomy, vol. 2201, 1994, pp. 502–507 (no month).

J. E. Graves et al., "The University of Hawaii adaptive optics system: III The Wavefront Curvature Sensor", SPIE Active and Adaptive Optical Systems, vol. 1542, 1991, pp. 262–272 (no month).

F. Roddier et al., "A Simple Low-Order Adaptive Optics System For Near-Infrared Applications", Publications of the Astronomical Society of the Pacific, vol. 103, Jan. 1991, pp. 131–149.

French Search Report dated Jul. 25, 1997, two pages.

*Primary Examiner*—John R Lee
*Attorney, Agent, or Firm*—Marshall, O'Toole, Gerstein, Murray & Borun

[57] ABSTRACT

A device for determining the phase errors of electromagnetic waves (OE) which are generated by a light source and transmitted by an optical instrument includes a reception system (SM) having at least one measurement plane (PM, PM3, PM4) provided with a plurality of measurement zones (ZM) which can measure the intensity of the received light and a collimation means (L1) for sending to the measurement plane (PM, PM3, PM4) the electromagnetic waves (OE) transmitted by the optical instrument. The device also includes a defocusing system (SD1, SD2) which can send at least one pair of associated planes (P1, P2), which are conjugate with the pupil plane of the optical instrument, to the reception system (SM) for them to be measured, a computation unit (UC) which determines the phase errors on the basis of measurements taken by the reception system (SM) on the associated planes (P1, P2), and a spatial filter (F) which is arranged in the image plane (P1) of the optical instrument, with the spatial filter restricting the area of the light source seen by the reception system (SM) while allowing the spatial spectrum of the phase errors to be transmitted.

16 Claims, 3 Drawing Sheets

DEVICE FOR DETERMINING THE PHASE ERRORS OF ELECTROMAGNETIC WAVES

BACKGROUND OF THE INVENTION

The present invention relates to a device for determining the phase errors of electromagnetic waves which are generated by a light source and transmitted by an optical instrument. Said device applies more particularly to the case in which the light source is an extended one.

Phase errors of this type are:

either continuous, for example when they are generated by constant deformations of an optical element, such as a mirror;

or time-varying, for example when they are generated by atmospheric turbulence.

Knowledge of such phase errors of electro-magnetic waves may, in particular, be used:

to evaluate the optical qualities of the optical instrument in question, for example a telescope; or to determine the control inputs of a correction means, for example a deformable mirror, which is arranged on the path of said electromagnetic waves and is intended to correct said phase errors.

Many devices are known which can determine such phase errors of electromagnetic waves.

A first device, which is known by the name "Shack Hartmann", includes for this purpose a battery of microlenses which generate images of the source on a receiver of the charge coupled device type. With a device of this type, it is sufficient to calculate the centers of mass of said images and determine their displacements relative to a fixed origin.

However, although effective for point sources, this device is ill-suited to extended sources, and the advocated image processing is difficult to carry out in real-time.

A second known device determining phase errors is a differential interferometer. An interferometer of this type uses an image of the pupil of the optical instrument and includes a birefringent optical element which splits said image of the pupil. The two partial images which are obtained are phase-shifted by about a quarter wavelength. Said differential interferometer further includes means for measuring the illuminations resulting from the interferences produced between these two partial images, the illuminations being proportional to the local slope of the deformations of the wavefront, which makes it possible to determine said phase errors.

However, this known device does not make it possible to measure all types of phase errors, since ambiguities arise in the measurements, in particular when said local slopes are too great.

A third known device is a curvature analyzer, for example such as the one described in an article by Roddier, Northcott and Graves, entitled "A simple low-order adaptive optics system for near-infrared applications" published in the journal "Publications of the Astronomical Society of the Pacific" in January 1991. A curvature analyzer of this type includes:

a reception system which comprises a measurement plane provided with a plurality of measurement zones having photodiodes capable of measuring the intensity of the received light. To this end, said reception system includes a battery of lenses which focus the electromagnetic waves on to said photodiodes;

a collimation lens for sending to said measurement plane the electromagnetic waves transmitted by said optical instrument;

a defocusing system consisting of a lens or a mirror with variable focal length and capable of sending at least one pair of associated planes, which are conjugate with the pupil plane of the optical instrument, to said reception system for them to be measured; and a computation unit which determines said phase errors on the basis of measurements taken by said reception system on said associated planes.

The device presented above is satisfactory, both in terms of its implementation and in terms of the accuracy of its measurements, when the electromagnetic waves to be analyzed are generated by a point source or a spatially limited source. However, this device cannot be used for extended sources.

SUMMARY OF THE INVENTION

The object of the present invention is to overcome these drawbacks. It relates to a device of the last-mentioned type, which can quickly and accurately, and if necessary in real-time, determine the phase errors of electromagnetic waves which are generated by a light source and transmitted by an optical system, irrespective of the size of the light source, that is to say both for a point source and for a spatially extended source.

To this end, according to the invention, the device for determining the phase errors of electro-magnetic waves which are generated by a light source and transmitted by an optical instrument, which device includes:

a reception system which comprises at least one measurement plane provided with a plurality of measurement zones which can measure the intensity of the received light;

a collimation means for sending to said measurement plane the electromagnetic waves transmitted by said optical instrument;

a defocusing system which can send at least one pair of associated planes, which are conjugate with the pupil plane of the optical instrument, to said reception system for them to be measured; and a computation unit which determines said phase errors on the basis of measurements taken by said reception system on said associated planes, is noteworthy in that it further includes a spatial filter which is arranged in the image plane of the optical instrument and is formed in such a way as to restrict the area of the light source seen by said reception system, while allowing the spatial spectrum of said phase errors to be transmitted.

According to the invention, said filter is chosen in accordance with the nature of the phase errors to be determined, in order to maximize the contrast of the images detected in the measurement plane.

The device according to the invention consequently makes it possible to take measurements, both for spatially restricted sources (possibly point sources) and for spatially extended sources, including sources having a spatial extent which is greater than the field observed by the optical instrument.

Preferably, said filter is produced in the form of an opaque mask provided with a hole. Of course, the diameter of this hole needs to be greater than the aberration spot produced by the phase errors in said image plane of the optical instrument.

In a first advantageous embodiment of the invention, said filter has a Gaussian-type profile of the transmitted light intensity, while in a second, particularly advantageous, embodiment, said filter has an amplitude and phase profile, of the transmitted light intensity, corresponding to the amplitude and phase profile of the optical aberrations due to the phase errors to be determined.

Advantageously, each of the measurement zones of the reception system is provided with a photoelectric receiver of the charge coupled device type.

The reception system thus has good spatial sampling, in contrast to the known reception system which was mentioned above and is provided with a battery of lenses.

Preferably, the computation unit determines the phase errors on the basis of the amplitudes of a plurality of modes corresponding to given geometrical shapes, for example Zernike modes.

In this case, advantageously, said computation unit determines the amplitudes of said modes, if necessary in real-time, while taking into account the measurements taken by said reception system, this being:

in a first embodiment, using a matrix calculation; and in a second embodiment, using a neurone-type calculation, which makes it possible to take account of nonlinearities.

Moreover, in an advantageous embodiment of the invention, the defocusing system includes means for splitting the electromagnetic waves into two partial beams, and means for sending said partial beams on to two different reception zones of the measurement plane, while making them cover paths of different lengths so that said reception system can simultaneously measure the two associated planes on said respective reception zones.

In another, particularly advantageous, embodiment, said defocusing system includes means for splitting said electromagnetic waves into two partial beams, and said reception system includes two separate measurement planes, each receiving one of said partial beams, said measurement planes being arranged in such a way as to simultaneously measure a respective one of said two associated planes.

In this case, said measurement planes are advantageously mounted on a moving equipment item, the displacement of which modifies the distance between said respective measured associated planes and the image plane of the optical instrument.

DESCRIPTION OF THE DRAWINGS

The figures of the appended drawing will clearly explain how the invention may be embodied. In these figures, identical references denote similar elements.

DETAILED DESCRIPTION OF THE PREFEREED EMBODIMENTS

Figure 1:
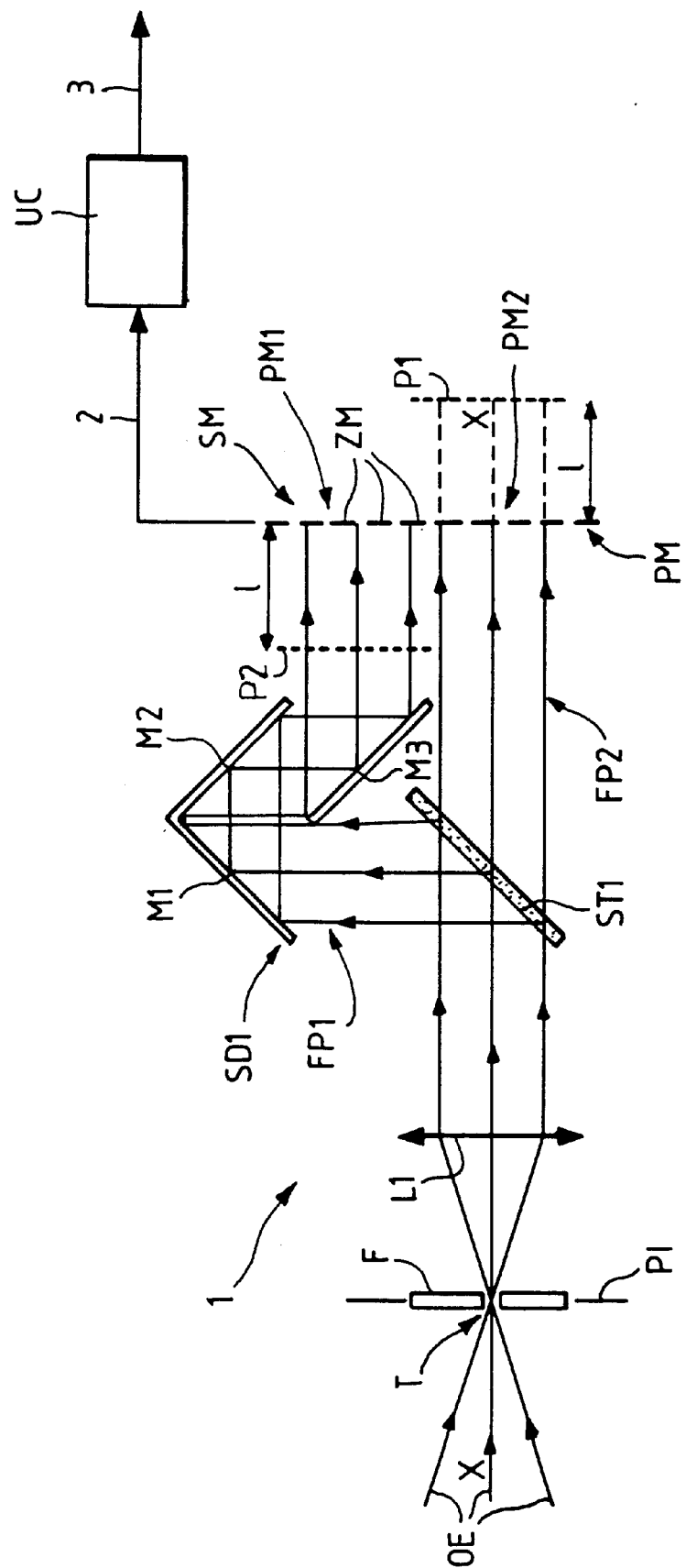
FIG. 1 schematically shows a device according to the invention, in a first embodiment.
Figure 3:
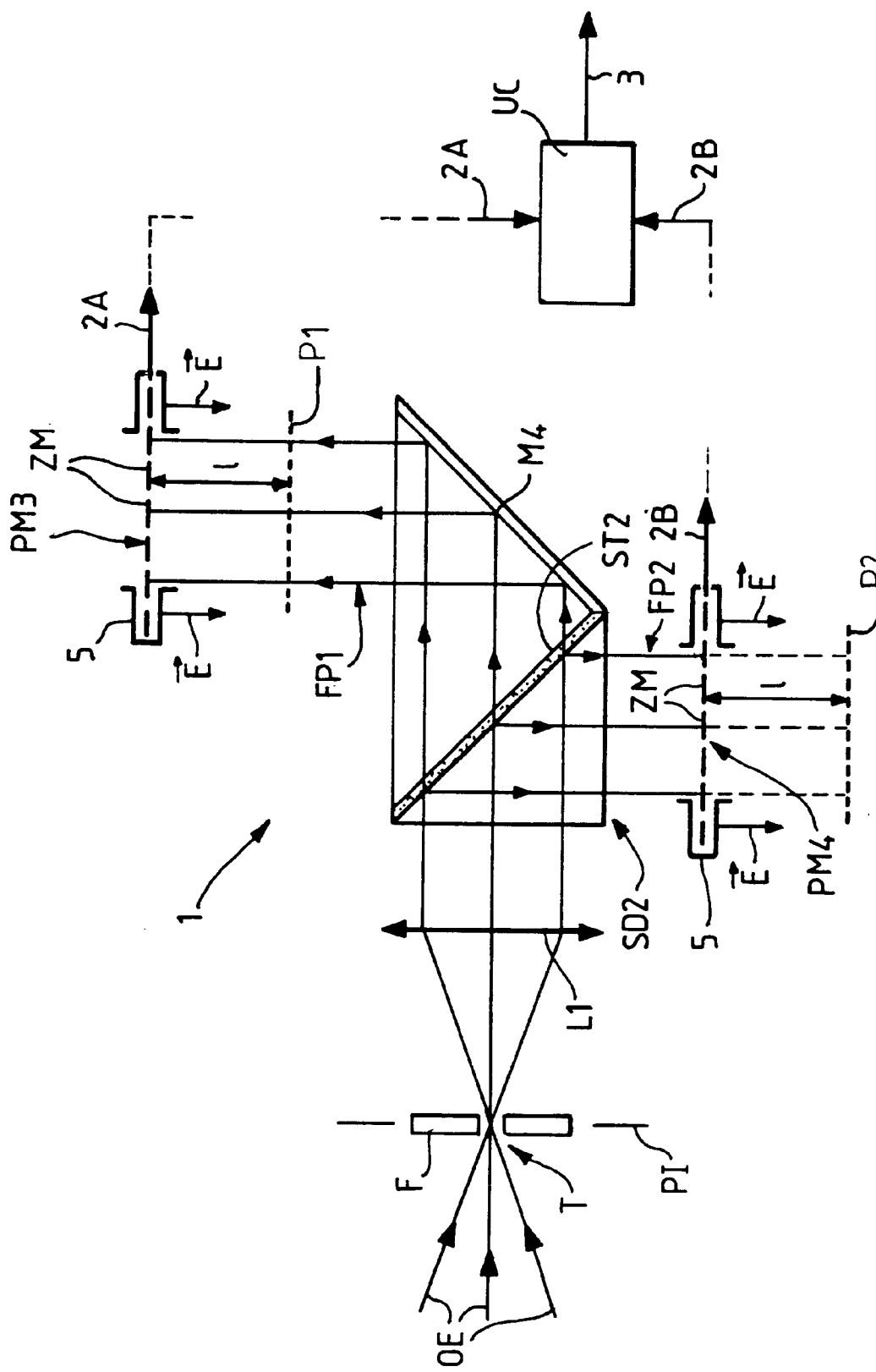
FIG. 3 schematically shows a device according to the invention, in a second embodiment.

The device 1 according to the invention, which is schematically represented in FIGS. 1 and 3, in first and second embodiments respectively, is intended for measuring the phase errors of electromagnetic waves OE which are generated by a light source (not shown) and transmitted by an optical instrument, for example a telescope (also not shown). It will be noted that, for the sake of clarity in the drawing, FIGS. 1 and 3 are not true to scale.

Figure 2:
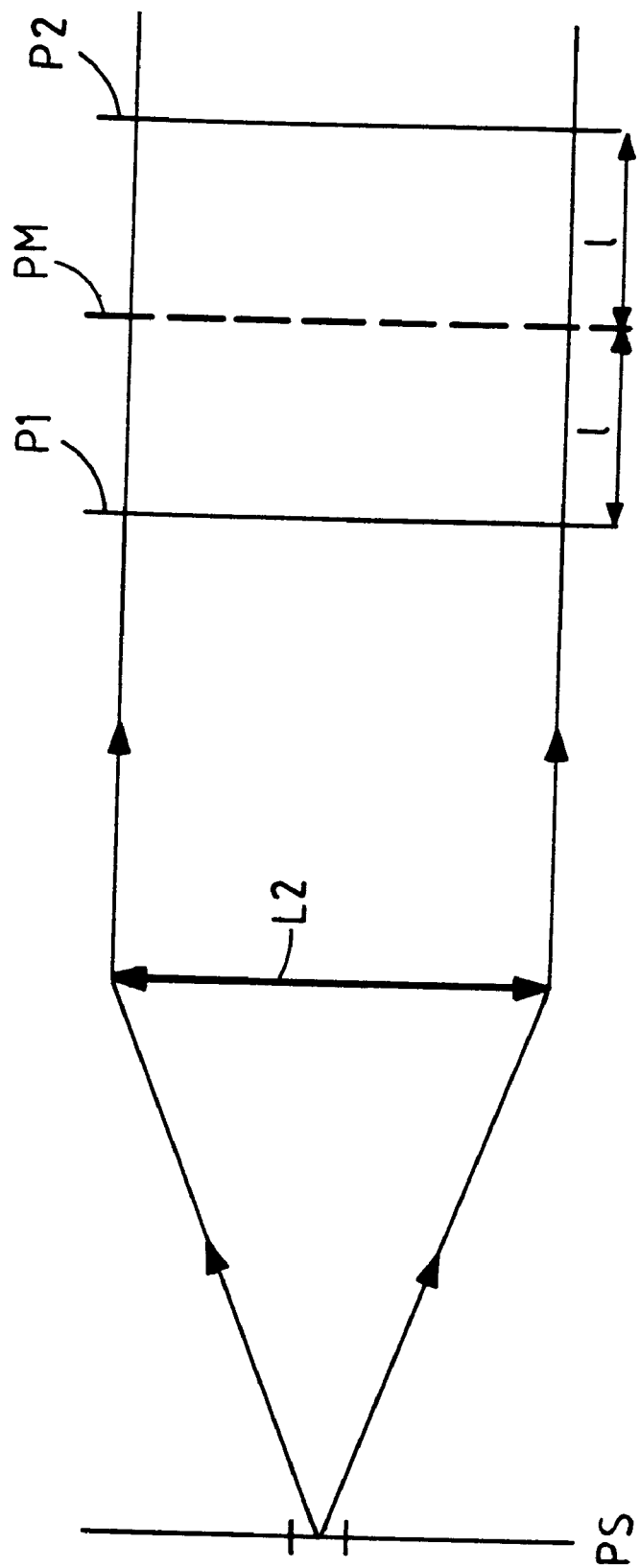
FIG. 2 schematically illustrates the planes measured during the implementation of the invention.

Said device 1 is of a known type including:

a reception system SM which comprises at least one measurement plane PM, provided with a plurality of measurement zones ZM which can measure the intensity of the received light;

an optical system, namely a lens L1, which collimates the electromagnetic waves OE transmitted by said optical system, on to said measurement plane PM;

a defocusing system SD1 or SD2 which can send at least one pair of associated planes P1 and P2, which are conjugate with the pupil plane of the optical instrument and also represented in FIG. 2, to said reception system SM for them to be measured; and a computation unit UC which determines said phase errors on the basis of the measurements which are taken by said reception system SM and are received by means of a link 2.

By virtue of the defocusing system SD1 or SD2, the reception system SM can therefore measure the light intensity of two associated planes P1 and P2, represented in FIG. 2. According to the invention, these two associated planes P1 and P2 are images of the pupil (see lens L2) of the optical instrument (not shown). FIG. 2 also shows the plane PS which is the source image plane. The planes P1 and P2 are at the same distance 1 on either side of the measurement plane PM of the reception system SM.

The difference between the light intensities measured respectively for these two planes P1 and P2 gives a value representing the corresponding local curvature of the wavefront of said electromagnetic waves OE. This principle is explained in the aforementioned article by Roddier, Northcott and Graves. This value is therefore also representative of the corresponding phase error in question.

The computation unit UC determines the phase errors on the basis of the measurements given by the reception system SM, by employing the aforementioned calculation method.

Said computation unit UC can deliver the results of its calculations, by means of a link 3, to a user device and, in particular, to a computer (not shown) which is intended to generate the control inputs of a known type of deformable mirror (not shown) which is arranged on the path of the electromagnetic waves OE and is intended to correct their phase errors.

As described above, the device for determining phase error can only take measurements for point sources or sources of restricted size, and not for spatially extended sources.

In order to overcome this drawback, according to the invention, the device 1 further includes a spatial filter F which consists of an opaque mask provided with a hole T and as arranged in said image plane PI of the optical instrument. This filter F is formed in such a way as to restrict the area of the light source seen by said reception system SM, while allowing transmission of the spatial spectrum of the phase errors to be determined.

Said filter F is chosen in accordance with the nature of the phase errors to be determined, in order to maximize the contrast of the images detected in the measurement plane PM.

Said device 1 according to the invention consequently makes it possible to take measurements both for spatially restricted sources and for spatially extended sources, including sources having a spatial extent which is greater than the field observed by the optical instrument.

It will be noted that the diameter of the hole T needs to be greater than the diameter of the aberration spot produced by the phase errors, at said image plane PI. If this were not so, the high frequencies of the phase errors would be eliminated by the filter F.

In a first embodiment of the invention, the filter F has a Gaussian-type profile of the transmitted light intensity.

On the other hand, in the case in which the amplitude and phase profile of the aberrations due to the phase errors to be determined is known, use will preferably be made, if possible, of a suitable optimal filter whose amplitude and phase profile corresponds to said known profile.

In one particular embodiment, in order to obtain good spatial sampling, the measurement zones ZM each consist of a photoelectric receiver (not shown) of the charge coupled device type, so that the measurement plane PM is provided with a matrix of N×M receivers (with, for example, N=M= 128).

Further, the defocusing system SD1 includes:
- a semisilvered mirror ST1 which splits the electromagnetic waves OE into two partial beams FP1 and FP2, one FP1 of which is sent directly on to a reception zone PM1 of the measurement plane PM; and
- a set of mirrors M1, M2 and M3 which send the partial beam FP2 on to a reception zone PM2 which belongs to the measurement plane PM and is adjacent to the reception zone PM1.

In this case, as can be seen in FIG. 1, the partial beams FP1 and FP2 cover paths of different lengths between the semisilvered mirror ST1 and the measurement plane PM.

These length differences are chosen in such a way that the measurement zone PM1 measures the light intensity representing the plane P1 in FIG. 2, and the measurement zone PM2 simultaneously measures the light intensity representing the plane P2, as illustrated in FIG. 1.

In contrast to a device with variable focal length, the defocusing system SD1, as described above, therefore makes it possible to take measurements simultaneously for the two associated planes P1 and P2.

Of course, the mirrors M1 and M3 may be replaced by other optical elements, for example a set of prisms, in order to direct the partial beam FP1 on to the reception zone PM1 with a greater path length than the partial beam FP2.

In another embodiment of the invention, which is represented in FIG. 3:
- the reception system SM comprises two measurement planes PM3 and PM4 which are separated from one another and are connected to the computation unit UC by links 2A and 2B, respectively; and
- the defocusing system SD2 comprises a semi-silvered mirror ST1 for generating two partial beams FP1 and FP2, one FP2 of which is sent directly on to the measurement plane PM1, and the other FP1 of which is sent on to a mirror M4 which reflects it on to the measurement plane PM3.

The paths of said partial beams FP1 and FP2 have different lengths, as in the embodiment of FIG. 1, for the same reasons as before, these being necessary for implementation of the invention.

Further, the measurement planes PM3 and PM4 are mounted on a mechanical equipment item 5, partially and schematically represented in FIG. 3, which can move in translation as illustrated by the arrows $\vec{E}$. Displacing this moving equipment item 5 simultaneously lengthens or shortens (depending on the direction) the respective distances l between the planes P1 and P2 and the measurement planes PM3 and PM4.

It will be noted that a moving equipment item of this type may also be envisaged when the reception system includes a single measurement plane which is provided with two separate reception zones, as in the embodiment in FIG. 1.

We claim:

1. A device for determining the phase errors of electromagnetic waves (OE) which are generated by a light source and transmitted by an optical instrument, said device (1) comprising:

a reception system (SM) which comprises at least one measurement plane (PM, PM3, PM4) provided with a plurality of measurement zones (ZM) which can measure the intensity of the received light;

a collimation means (L1) for sending to said measurement plane (PM, PM3, PM4) the electromagnetic waves (OE) transmitted by said optical instrument;

a defocusing system (SD1, SD2) which can send at least one pair of associated planes (P1, P2), which are conjugate with a pupil plane of the optical instrument, to said reception system (SM) for them to be measured;

a computation unit (UC) which determines said phase errors on the basis of measurements taken by said reception system (SM) on said associated planes (P1, P2); and a spatial filter (F) which is arranged in an image plane (PI) of the optical instrument, said spatial filter restricting the area of the light source seen by said reception system (SM) while allowing the spatial spectrum of said phase errors to be transmitted, said spatial filter (F) comprising an opaque mask provided with a hole (T) having a diameter, said diameter of said hole (T) being greater than the diameter of the aberration spot produced by the phase errors at the image plane, said filter (F) having a Gaussian profile of the intensity of the light transmitted by the optical instrument.

2. The device as claimed in claim 1, wherein each of the measurement zones (ZM) of the reception system (SM) is provided with a charge coupled device that acts as a photoelectric receiver.

3. The device as claimed in claim 1, wherein said phase errors include a plurality of modes and wherein the computation unit (UC) determines the amplitudes of said modes using a matrix calculation while taking into account the measurements taken by said reception system.

4. The device as claimed in claim 1, wherein said phase errors include a plurality of modes and wherein the computation unit (UC) determines the amplitudes of said modes using a neurone calculation while taking into account the measurements taken by said reception system.

5. The device as claimed in claim 1, wherein the computation unit (UC) performs the calculations in real-time.

6. The device as claimed in claim 1, wherein said defocusing system (SD1) includes means (ST1) for splitting the electromagnetic waves (OE) into two partial beams (FP1, FP2), and means (M1, M2, M3) for sending said partial beams (FP1, FP2) on to two different reception zones (PM1, PM2) of the measurement plane (PM), while making them cover paths of different lengths so that said reception system (SM) can simultaneously measure the two associated planes (P1, P2) on said respective reception zones (PM1, PM2).

7. The device as claimed in claim 1, wherein said defocusing system (SD2) includes means (ST2) for splitting said electromagnetic waves (OE) into two partial beams (FP1, FP2), and wherein said reception system (SM) includes two separate measurement planes (PM3, PM4), each receiving one of said partial beams (FP1, FP2), said measurement planes (PM3, PM4) being arranged in such a way as to simultaneously measure a respective one of said two associated planes (P1, P2).

8. The device as claimed in claim 7, wherein said measurement planes (PM3, PM4) are mounted on a moving equipment item (5), the displacement of which modifies the distance (1) between said respective measured associated planes (P1, P2) and the image plane (PI) of the optical instrument.

9. A device for determining the phase errors of electromagnetic waves (OE) which are generated by a light source and transmitted by an optical instrument, said device (1) comprising:

a reception system (SM) which comprises at least one measurement plane (PM, PM3, PM4) provided with a plurality of measurement zones (ZM) which can measure the intensity of the received light;

a collimation means (L1) for sending to said measurement plane (PM, PM3, PM4) the electromagnetic waves (OE) transmitted by said optical instrument;

a defocusing system (SD1, SD2) which can send at least one pair of associated planes (P1, P2), which are conjugate with a pupil plane of the optical instrument, to said reception system (SM) for them to be measured;

a computation unit (UC) which determines said phase errors on the basis of measurements taken by said reception system (SM) on said associated planes (P1, P2); and a spatial filter (F) which is arranged in an image plane (PI) of the optical instrument, said spatial filter restricting the area of the light source seen by said reception system (SM) while allowing the spatial spectrum of said phase errors to be transmitted, said spatial filter (F) comprising an opaque mask provided with a hole (T) having a diameter, said diameter of said hole (T) being greater than the diameter of the aberration spot produced by the phase errors at the image plane, said filter (F) having an amplitude and phase profile, of the intensity of the light transmitted by the optical instrument, corresponding to the amplitude and phase profile of the optical aberrations due to the phase errors to be determined.

10. The device as claimed in claim 9, wherein each of the measurement zones (ZM) of the reception system (SM) is provided with a charge coupled device that acts as a photoelectric receiver.

11. The device as claimed in claim 9, wherein said phase errors include a plurality of modes and wherein the computation unit (UC) determines the amplitudes of said modes using a matrix calculation while taking into account the measurements taken by said reception system.

12. The device as claimed in claim 9, wherein said phase errors include a plurality of modes and wherein the computation unit (UC) determines the amplitudes of said modes using a neurone calculation while taking into account the measurements taken by said reception system.

13. The device as claimed in claim 9, wherein the computation unit (UC) performs the calculations in real-time.

14. The device as claimed in claim 9, wherein said defocusing system (SD1) includes means (ST1) for splitting the electromagnetic waves (OE) into two partial beams (FP1, FP2), and means (M1, M2, M3) for sending said partial beams (FP1, FP2) on to two different reception zones (PM1, PM2) of the measurement plane (PM), while making them cover paths of different lengths so that said reception system (SM) can simultaneously measure the two associated planes (P1, P2) on said respective reception zones (PM1, PM2).

15. The device as claimed in claim 9, wherein said defocusing system (SD2) includes means (ST2) for splitting said electromagnetic waves (OE) into two partial beams (FP1, FP2), and wherein said reception system (SM) includes two separate measurement planes (PM3, PM4), each receiving one of said partial beams (FP1, FP2), said measurement planes (PM3, PM4) being arranged in such a way as to simultaneously measure a respective one of said two associated planes (P1, P2).

16. The device as claimed in claim 15, wherein said measurement planes (PM3, PM4) are mounted on a moving equipment item (5), the displacement of which modifies the distance (1) between said respective measured associated planes (P1, P2) and the image plane (PI) of the optical instrument.

* * * * *